UNITED STATES PATENT OFFICE 2,552,538

DIAMIDOTHIOPHOSPHATES

Lewis R. Drake, Midland, and Clarence L. Moyle, Clare, Mich., assignors to The Dow Chemical Company, Midland, Mich., a corporation of Delaware No Drawing. Application October 15, 1948, Serial No. 54,834

6 Claims. (Cl. 260—461)

This invention is concerned with diamidothiophosphates and is particularly directed to compounds of the formula:

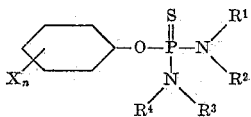

wherein X represents chlorine or bromine, $R^1$ represents an alkyl radical, each of $R^2$, $R^3$, and $R^4$ is selected from the group consisting of hydrogen, alkyl, aralkyl and cycloalkyl, and $n$ is an integer from 3 to 5, inclusive.

Several methods may be employed for the preparation of the new compounds. One such procedure includes reacting the desired polyhalophenol with thiophosphoryl chloride ($PSCl_3$) in the presence of pyridine to produce as an intermediate an O-polyhalophenyl dichlorothiophosphate of the formula:

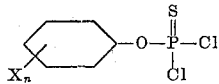

This intermediate is then reacted (1) with a suitable amine, (2) successively with two different amines, or (3) successively with a suitable amine and ammonia.

In carrying out the initial step of this reaction to obtain the intermediate, one molecular proportion of the phenol is conveniently dissolved in an excess of pyridine and the solution added portionwise and with stirring to one molecular proportion of the thiophosphoryl chloride. Alternatively, a mixture of pyridine and an inert solvent such as benzene may be substituted for the excess pyridine, provided only that at least one molecular proportion of pyridine be present for each molecular proportion of phenol in the ultimate solution. The reaction between the phenol and thiophosphoryl chloride is exothermic and the temperature of the reaction mixture increases somewhat during the addition of the phenol solution. It has been found that the reaction takes place at temperatures of from 30° C. to 100° C. depending upon the particular phenol concerned. In practice, it is frequently convenient to operate at the boiling temperature of the reaction mixture and under reflux. By-product pyridine hydrochloride may be separated from the reaction mixture by filtration if desired, otherwise the unmodified crude intermediate is employed as a reactant in the next step of the process.

In an alternative method for preparing the O-polyhalophenyl dichlorothiophosphate intermediate, the phenol and pyridine in the proportions described in the preceding paragraph are reacted with a large excess of thiophosphoryl chloride, e. g. 3 to 10 molecular proportions. The mixture is then filtered to separate pyridine hydrochloride, and the filtrate partially fractionally distilled under reduced pressure to recover excess and unreacted thiophosphoryl chloride. The still residue from this stripping operation consists essentially of O-polyhalophenyl dichlorothiophosphate and is employed in the subsequent reaction steps with amines, or amine and ammonia.

In the second step of the preparation, the intermediate O - polyhalophenyl dichlorothiophosphate is reacted with an alkyl, dialkyl, aralkyl, cycloalkyl, dicycloalkyl, or N-alkyl cycloalkyl amine. Where it is desired to introduce two identical alkyl amine or cycloalkyl amine groups into the molecule, a minimum of 4 molecular proportions of the amine is added portionwise to the intermediate with stirring at a temperature of from about 25° to 100° C. Where it is desired that the substituting amino groups differ, 2 molecular proportions each of the appropriate amine compounds may be successively added to the intermediate under the usual reaction conditions.

Where only one chlorine is to be replaced by a substituted amino group, 2 molar proportions of the amine is added portionwise with stirring to one mol of the intermediate, the reaction mixture filtered to remove amine hydrochloride, and the filtrate reacted with an excess of ammonia. The latter reaction may be accomplished either by adding the filtrate to an excess of liquid ammonia with stirring, or by exhaustively passing anhydrous gaseous ammonia thru the intermediate reaction product. In either event, large excesses of ammonia are employed to provide for the reaction of by-product hydrogen chloride to form ammonium chloride.

The crude thiophosphate products as obtained in the practice of the foregoing reactions, have utility without further modification for the preparation of parasiticidal mixtures. However, some purification is frequently desirable. In one such operation, the crude product may be dissolved in a water immiscible organic solvent such as benzene or methylene dichloride, washed as with dilute aqueous hydrochloric acid, dilute aqueous alkali and water, and dried with anhydrous sodium sulphate or calcium chloride. The organic solvent is then removed by evaporation to obtain the desired diamidothiophosphate product as a residue.

A further method for preparing the new compounds comprises reacting (1) a polyhalophenol with an alkyl or cycloalkyl N-substituted dichlorothiophosphoramide, and (2) the resulting intermediate with a suitable amine or ammonia. The phenol and dichlorothiophosphoramide compound of the formula:

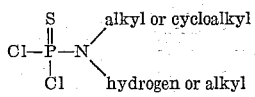

are reacted in approximately equimolecular proportion. In one modification, the initial reaction is carried out in the presence of pyridine as previously described. In an alternative procedure, the phenol and a molecular equivalent of sodium are dispersed in an organic solvent such as benzene or a lower aliphatic alcohol, and such solution added portionwise with stirring to the dichlorothiophosphoramide compound at a reaction temperature of from about 30° to 100° C. Two molecular proportions of an alkyl, aralkyl or cycloalkyl amine or ammonia is then added to the intermediate product with cooling and stirring, and the mixture heated to 50°–100° C. to complete the reaction and obtain a crude thiophosphate product. If desired, the latter may be taken up in a water immiscible organic solvent, subjected to various washings and dried, all as previously described. The organic solvent is then evaporated out of the mixture to obtain the desired diamidothiophosphate as a residue.

The N-substituted dichlorothiophosphoramides employed as starting materials in preparing the new diamidothiophosphates, may be prepared by reacting a hydrochloride of a suitable alkyl or cycloalkyl amine with a molecular excess of thiophosphoryl chloride (PSCl$_3$). Good yields are obtained in preparations employing from 2 to 4 molecular proportions of thiophosphoryl chloride per molecular proportion of the amine salt. The reaction is carried out at the boiling temperature of the reaction mixture and is accompanied by the evolution of hydrogen chloride. Following completion of the reaction, the mixture is fractionally distilled under reduced pressure to obtain the desired N-substituted dichlorothiophosphoramide.

The new diamidothiophosphates are for the most part oils or low melting solids, substantially insoluble in water, somewhat soluble in many organic solvents, and non-corrosive to the skin of humans. They are of value as toxic constituents of insecticidal and fungicidal compositions.

The following examples illustrate the invention but are not to be construed as limiting.

*Example 1.—O-2,4,5-trichlorophenyl N,N,N',N'-tetramethyldiamidothiophosphate*

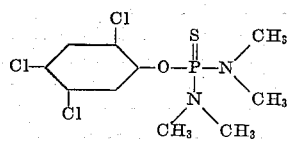

19.5 grams (0.1 mol) of 2,4,5-trichlorophenol was dissolved in a mixture of 8 grams (0.1 mol) of pyridine and 50 milliliters of benzene and this solution added portionwise and with stirring to 17 grams (0.1 mol) of thiophosphoryl chloride. Some heat of reaction was evolved and the mixture was allowed to stand for 16 hours. At the end of this time by-product pyridine hydrochloride was removed by filtration. 32 grams (0.72 mol) of dimethylamine was added to the reaction mixture with stirring and the mixture allowed to stand for 12 hours. The crude product was then filtered to remove by-product dimethylamine hydrochloride, and the filtrate successively washed with dilute aqueous sodium hydroxide and water and dried with anhydrous sodium sulphate. The benzene was then removed by evaporation to obtain an O-2,4,5-trichlorophenyl N,N,N',N'-tetramethyldiamidothiophosphate product as a light yellow oil having a density of 1.36 at 27° C. and a refractive index $n/D$ of 1.5823 at 35° C.

*Example 2.—O-2,4,5-trichlorophenyl N,N,N'N'-tetranormalpropyldiamidothiophosphate*

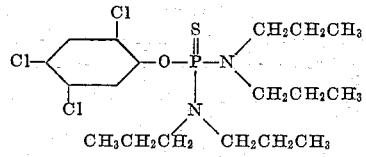

In a similar fashion 19.5 grams (0.1 mol) of 2, 4, 5-trichlorophenol, 17 grams (0.1 mol) of thiophosphoryl chloride and 44 grams (0.4 mol) of dinormalpropylamine were reacted together in the presence of 8 grams (0.1 mol) of pyridine and 50 milliliters of benzene. From this reaction there was obtained an O-2,4,5-trichlorophenyl N,N,N',N' - tetranormalpropyldiamidothiorphosphate product as a yellow-orange oil having a density of 1.4 at 27° C. and a refractive index $n/D$ of 1.5628 at 35° C.

*Example 3.—O-2,4,5-trichlorophenyl N,N,N',N'-tetraethyldiamidothiophosphate*

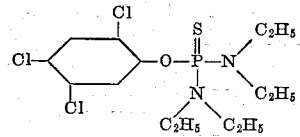

19.5 grams (0.1 mol) of 2,4,5-trichlorophenol was dissolved in 10 grams of pyridine (0.12 mol) and 50 milliliters of diethyl ether. This solution was added portionwise and with mixing to 17 grams (0.1 mol) of thiophosphoryl chloride. Some heat of reaction was evolved and the mixture was allowed to stand for 3 hours. At the end of this time 29.2 grams (0.4 mol) of diethylamine was added to the product along with an additional 100 milliliters of diethyl ether. The reaction temperature was maintained at the boiling temperature of the mixture for several minutes to complete the reaction, and thereafter cooled. After standing for 16 hours, the crude reaction product was diluted with 100 milliliters of benzene, successively washed with dilute aqueous sodium bicarbonate and water, and dried with anhydrous sodium sulphate. The liquid remnant was evaporated to dryness to obtain an O-2,4,5-trichlorophenyl N,N,N',N' - tetraethyl - diamidothiophosphate product as a brown viscous oil having a density of 1.36 at 28° C. and a refractive index $n/D$ of 1.5790 at 28.5° C.

*Example 4.—O - 2,4,5 - trichlorophenyl N,N,N' - Triethyldiamidothiophosphate*

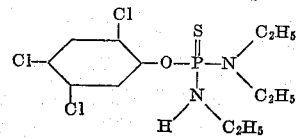

19.5 grams (0.1 mol) of 2,4,5-trichlorophenol was dissolved in 8 grams (0.1 mol) of pyridine and 50 milliliters of benzene. This solution was added portionwise and with stirring to 17.8 grams (0.1 mol) of N-ethyl dichlorothiophosphoramide, and the mixture allowed to stand for 16 hours. At the end of this time by-product pyridine hydrochloride was recovered by filtration, and 20 grams (0.27 mol) of diethylamine added to the filtrate with agitation. The mixture was allowed to stand for 16 hours and thereafter filtered to remove by-product diethylamine hydrochloride. The filtrate was successively washed with dilute aqueous sodium hydroxide and water, and dried over anhydrous sodium sulphate. Upon evaporation of the benzene there was obtained an O-2,4,5-trichlorophenyl N,N,N'-triethyldiamidothiophosphate product as a dark brown oil having a density of 1.39 at 27° C. and a refractive index $n/D$ of 1.5823 at 35° C.

*Example 5.—O-2,4,5-trichlorophenyl N,N-dimethyl-N'-ethyldiamidothiophosphate*

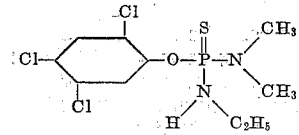

In accordance with the method described in Example 4, 0.1 mol of N-ethyl dichlorothiophosphoramide and 0.1 mol of 2,4,5-trichlorophenol were reacted together in the presence of a solution of 0.1 mol of pyridine in 50 milliliters of benzene. After filtering to remove pyridine hydrochloride, 16 grams (0.36 mol) of dimethylamine was added to the mixture. The crude reaction product was worked up in the usual manner to obtain an O-2,4,5-trichlorophenyl N,N-dimethyl-N'-ethyldiamidothiophosphate product as a viscous orange liquid having a density of 1.30 at 27° C. and a refractive index $n/D$ of 1.5777 at 35° C.

*Example 6.—O-2,4,5-trichlorophenyl N-normalbutyl-N'-ethyldiamidothiophosphate*

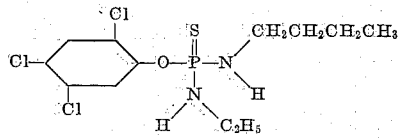

20 grams (0.27 mol) of normalbutylamine was substituted for the dimethylamine as shown in Example 5 to obtain an O-2,4,5-trichlorophenyl N-normalbutyl-N'-ethyldiamidothiophosphate product as a mobile yellow-brown oil having a density of 1.22 at 27° C. and a refractive index $n/D$ of 1.5610 at 35° C.

*Example 7.—O-2,4,5-trichlorophenyl N-normalbutyldiamidothiophosphate*

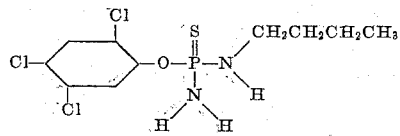

19.5 grams (0.1 mol) of 2,4,5-trichlorophenol was dissolved in 50 milliliters of pyridine and added portionwise with stirring to 20.6 grams (0.1 mol) of N-normalbutyl dichlorothiophosphoramide and 50 milliliters of benzene. This mixture was heated to boiling temperature for a few minutes and thereafter allowed to stand for 16 hours. Pyridine hydrochloride was removed from the mixture by filtration, and the filtrate poured into 50 milliliters of liquid ammonia. The excess ammonia was evaporated off over a period of 16 hours at room temperature and the crude reaction mixture filtered to separate ammonium chloride. The filtrate was washed with dilute aqueous sodium bicarbonate, dilute aqueous hydrochloric acid and water, and dried with anhydrous sodium sulphate. The resulting liquid remnant was evaporated to dryness to obtain an O-2,4,5-trichlorophenyl N-normalbutyldiamidothiophosphate product as a viscous orange liquid having a density of 1.364 at 29° C. and a refractive index $n/D$ of 1.5780 at 29.5° C.

*Example 8.—O-2,4,5-trichlorophenyl N-ethyldiamidothiophosphate*

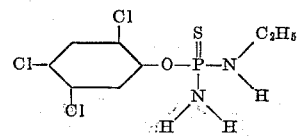

In a similar fashion 0.1 mol quantities each of 2,4,5-trichlorophenol, pyridine and N-ethyl dichlorothiophosphoramide were reacted together in 50 milliliters of benzene and thereafter with an excess of liquid ammonia. Pyridine hydrochloride and ammonium hydrochloride were separated during the course of the reaction as described in Example 7, and the crude reaction product washed, dried and evaporated to dryness in the usual fashion. As a residue, there was obtained an O-2,4,5-trichlorophenyl N-ethyldiamidothiophosphate product as a light yellow crystalline solid melting at 87°–93° C.

*Example 9.—O-2,4,6-trichlorophenyl N-cyclohexyl-N'-ethyldiamidothiophosphate*

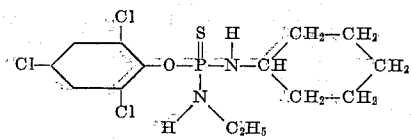

1.84 grams (0.08 mol) of sodium and 15.8 grams (0.08 mol) of 2,4,6-trichlorophenol were reacted together in 75 milliliters of ethyl alcohol, and the alcoholic phenolate solution added portionwise and with stirring over a period of 5 minutes and at a temperature of 55°–60° C. to 14.3 grams (0.08 mol) of N-ethyl dichlorothiophosphoramide (boiling at 94°–98° C. at 8 millimeters' pressure and having a density of 1.36 at 25° C.). The reaction mixture was heated and stirred for 5 minutes at 60°–65° C. and thereafter cooled to 28°–32° C. The latter temperature range was maintained during the portionwise addition of 16 grams (0.16 mol) of cyclohexylamine. Cooling was suspended, and the temperature rose to 42° C. The mixture was allowed to stand at room temperature for 16 hours to evaporate off a portion of the ethyl alcohol. The residue from the evaporation step was dissolved in 40 milliliters of methylene dichloride, successively washed with dilute aqueous ammonium hydroxide, dilute aqueous hydrochloric acid and water, and dried over anhydrous sodium sulphate. The methylene dichloride was then evaporated off under reduced pressure to obtain an O-2,4,6-trichlorophenyl N-cyclohexyl-N'-ethyldiamidothiophosphate product as a brown oil having a density of 1.26 at 32° C. and a refractive index $n/D$ of 1.5360 at 35° C.

Example 10.—O-2,4,6-trichlorophenyl N-ethyl-N'-methyldiamidothiophosphate

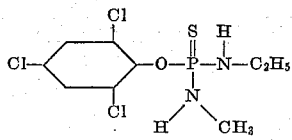

In a similar fashion, 1.84 grams (0.08 mol) of sodium, 15.8 grams (0.08 mol) of 2,4,6-trichlorophenol and 14.3 grams (0.08 mol) of N-ethyl dichlorothiophosphoramide were reacted together in ethyl alcohol. The resulting intermediate product was blown at 30°-40° C. with gaseous methylamine until basic to litmus. Upon cooling, the mixture partially solidified. The alcohol was in part evaporated off at room temperature, and the residue dissolved in 40 milliliters of methylene dichloride. This solution was successively washed with dilute aqueous hydrochloric acid, dilute aqueous ammonium hydroxide, dilute aqueous hydrochloric acid and water, and dried over anhydrous sodium sulphate. The methylene dichloride was then evaporated off to obtain an O-2,4,6-trichlorophenyl N-ethyl-N'-methyldiamidothiophosphate product as a viscous brown oil having a density of 1.31 at 32° C., and a refractive index $n/D$ of 1.5432 at 35° C.

Example 11.—O-pentachlorophenyl N-cyclohexyl-N'-ethyldiamidothiophosphate

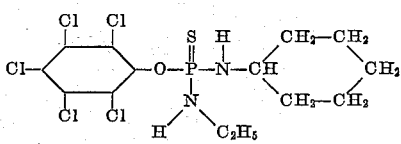

In accordance with the method of example 9, 1.84 grams (0.08 mol) of sodium, 21.3 grams (0.08 mol) of pentachlorophenol, and 14.3 grams (0.08 mol) of N-ethyl dichlorothiophosphoramide were reacted together in 75 milliliters of ethyl alcohol. In this preparation, the alcoholic phenolate solution was added to the N-ethyl dichlorothiophosphoramide over a period of ten minutes and at 55°-60° C., and the mixture heated to its boiling temperature and under reflux. The mixture was then cooled to 25° C., and 16 grams ((0.16 mol) of cyclohexyl amine added portionwise with stirring over a period of ten minutes. The temperature increased to 40° C. at the beginning of the amine addition and was maintained at 40°-50° C. throughout. The resulting crude product was processed as described in Example 9 to obtain an O-pentachlorophenyl N-cyclohexyl-N'-ethyldiamidothiophosphate product as a viscous brown oil having a density of 1.40 at 27° C., and a refractive index $n/D$ of 1.5635 at 35° C.

Example 12.—O-2,4,5-trichlorophenyl N-ethyl-N-methyldiamidothiophosphate

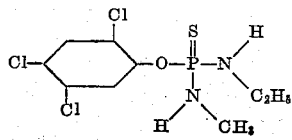

1.84 grams (0.08 mol) of sodium, 15.8 grams (0.08 mol) of 2,4,5-trichlorophenol, 14.3 grams (0.08 mol) of N-ethyl dichlorothiophosphoramide, and 11.5 grams (0.38 mol) of methyl amine were reacted together in 75 milliliters of methyl alcohol substantially as described in Example 10. As the principal product of reaction there was obtained an O-2,4,5-trichlorophenyl N-ethyl-N'-methyldiamidothiophosphate product as a light brown oil having a density of 1.28 at 30° C., and a refractive index $n/D$ of 1.5354 at 35° C.

Example 13.—O-2,4,5-trichlorophenyl N-normaldodecyl-N'-ethyldiamidothiophosphate

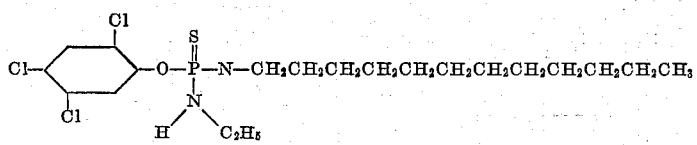

1.84 grams (0.08 mol) of sodium and 15.8 grams (0.08 mol) of 2,4,5-trichlorophenol were reacted together in 70 milliliters of methyl alcohol, and the resulting solution added portionwise and with stirring over a period of 5 minutes to 14.3 grams (0.08 mol) of N-ethyl dichlorothiophosphoramide dissolved in 15 milliliters of methyl alcohol. The temperature of the reaction mixture was 50°-55° C. during the addition, and the mixture was thereafter heated and stirred for 5 minutes at 60°-65° C. to complete the reaction. The mixture was cooled, and 29.7 grams (0.16 mol) of normaldodecylamine added with stirring. The temperature gradually increased to 50° C., and the mixture was heated and stirred at 50°-55° C. for 5 minutes. The crude reaction product was dissolved in 40 milliliters of methylene dichloride and successively washed with dilute aqueous ammonium hydroxide, dilute aqueous hydrochloric acid, dilute aqueous acetic acid, and water. In each of these washing operations, emulsions were formed and it was necessary to add from 25 to 40 milliliters of ethyl alcohol to accomplish separation of the aqueous wash layer from the product. The methylene dichloride solution was finally dried with anhydrous sodium sulphate, and the solvent removed by evaporation to obtain an O-2,4,5-trichlorophenyl N-normaldodecyl-N'-ethyldiamidothiophosphate product as a thin orange oil having a density of 1.12 at 27° C., and a refractive index $n/D$ of 1.5223 at 35° C.

Example 14.—O-2,4,5-trichlorophenyl N-cyclohexyl-N'-ethyldiamidothiophosphate

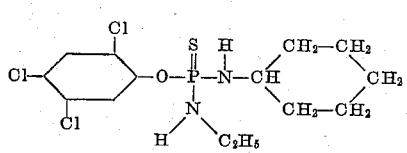

In accordance with the method of Example 9, a reaction was carried out employing 0.6 mol quantities each of 2,4,5-trichlorophenol, sodium and N-ethyl dichlorothiophosphoramide, and 1.22 mols of cyclohexyl amine in the presence of 600 milliliters of ethyl aclohol. The usual purification steps were carried out to obtain an O-2,4,5-trichlorophenyl N-cyclohexyl-N'-ethyldiamidothiophosphate product as an orange oil having a density of 1.27 at 30° C. and a refractive index $n/D$ of 1.5390 at 35° C.

Example 15.—O-2,4,5-trichlorophenyl N,N-diethyl-N'-cyclohexyldiamidothiophosphate

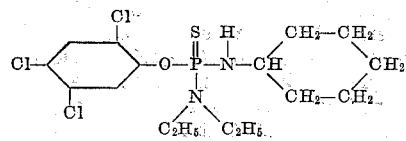

In a similar fashion 0.05 mol quantities each of 2,4,5-trichlorophenol, sodium and N,N-diethyl dichlorothiophosphoramide (boiling at 98°–100° C. at 7 mm. pressure), and 0.1 mol quantity of cyclohexylamine were reacted together and the crude reaction product purified, all as described in Example 9. An O-2,4,5-trichlorophenyl N,N-diethyl - N' - cyclohexyldiamidothiophosphate product was obtained as a mobile yellow oil having a camphor like odor, a density of 1.23 at 25° C., and a refractive index n/D of 1.5490 at 25° C.

Example 16.—O-2,4,5-trichlorophenyl N-normal-butyl-N'-cyclohexyldiamidothiophosphate

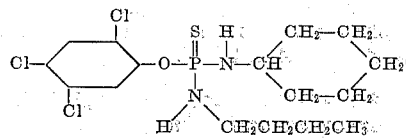

0.05 mol quantities of sodium, 2,4,5-trichlorophenol and N-normalbutyl dichlorothiophosphoramide (boiling at 120°–130° C. at 4 millimeters' pressure and having a density of 1.22 at 24° C.), and 0.1 mol of cyclohexyl amine were reacted together as described in Example 9. Following the usual washing and evaporation steps there was obtained an O-2,4,5-trichlorophenyl N-normalbutyl-N'-cyclohexyldiamidothiophosphate product as a dark brown oil having a density of 1.13 at 31° C., and a refractive index n/D of 1.5148 at 35° C.

Example 17.—O-2,4,5-trichlorophenyl N,N-dicyclohexyl-N'-ethyldiamidothiophosphate

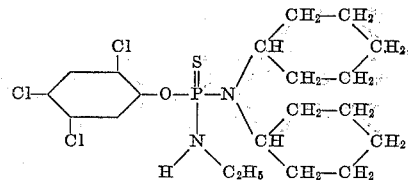

2.3 grams (0.1 mol) of sodium and 19.75 grams (0.1 mol) of 2,4,5-trichlorophenol were mixed together in 100 milliliters of ethyl alcohol to produce an alcoholic phenolate solution. This solution was added portionwise with stirring over a period of 4 minutes and at a temperature of 50°–60° C. to 17.8 grams (0.1 mol) of N-ethyl dichlorothiophosphoramide, and the reaction mixture thereafter stirred at 60°–65° C. for 5 minutes. 36.2 grams (0.2 mol) of dicyclohexylamine was then added to the mixture portionwise over a period of 5 minutes, and the mixture stirred and heated at 60° C. for 5 minutes to complete the reaction. The excess ethyl alcohol was then evaporated out of the crude reaction product and the residue washed with an excess of dilute aqueous sulfuric acid. The resulting crude product was dissolved in 50 milliliters of methylene dichloride, and the solution successively washed with dilute aqueous ammonium hydroxide, dilute aqueous hydrochloric acid and water, and dried over anhydrous sodium sulfate. The methylene dichloride was then evaporated out of the mixture to obtain an O-2,4,5-trichlorophenyl N,N-dicyclohexyl-N'-ethyldiamidothiophosphate product as a dark orange oil having a sweet camphor-like odor, a density of 1.23 at 27° C., and a refractive index n/D of 1.5402 at 35° C.

Example 18.—O-2,3,4,6-tetrachlorophenyl-N-cyclohexyl-N'-ethyldiamidothiophosphate

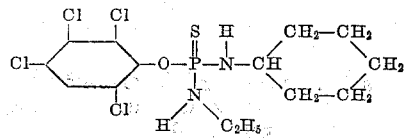

In accordance with the procedure described in the preceding example, 2.3 grams (0.1 mol) of sodium, 23.2 grams (0.1 mol) of 2,3,4,6-tetrachlorophenol, 17.8 grams (0.1 mol) of N-ethyl dichlorothiophosphoramide, and 20 grams (0.2 mol) of cyclohexylamine were reacted together in ethyl alcohol. The resulting crude product was dispersed in 50 milliliters of methylene dichloride and washed and dried in the usual manner. The methylene dichloride was then removed by evaporation under reduced pressure to obtain an O-2,3,4,6-tetrachlorophenyl N-cyclohexyl-N'-ethyldiamidothiophosphate product as a dark orange oil having a sweet aromatic odor, a density of 1.26 at 26° C., and a refractive index n/D of 1.5413 at 35° C.

Example 19.—O-2,4,6-tribromophenyl N-cyclohexyl-N'-ethyldiamidothiophosphate

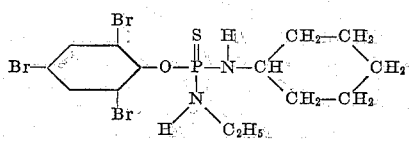

23.2 grams (0.1 mol) of 2,4,6-tribromophenol, 2.3 grams (0.1 mol) of sodium, 17.8 grams (0.1 mol) of N-ethyldichlorothiophosphoramide, and 20 grams (0.2 mol) of cyclohexylamine were reacted together as described in Example 17. The crude reaction product was dispersed in methylene dichloride and washed and dried in the usual fashion. The methylene dichloride was evaporated out of the mixture to obtain an O-2,4,6-tribromophenyl N-cyclohexyl-N'-ethyldiamidothiophosphate product as a sweet-smelling orange oil having a density of 1.32 at 26° C., and a refractive index n/D of 1.5379 at 35° C.

Example 20.—O-2,4,5-trichlorophenyl n-normal-dodecyldiamidothiophosphate

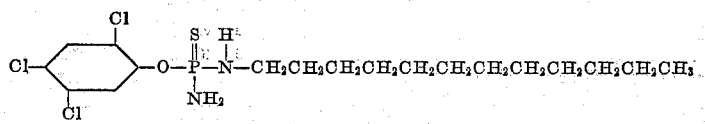

0.1 mol of 2,4,5-trichlorophenol was dissolved in a solution of 0.1 mol of pyridine in 50 milliliters of benzene. This mixture was added portionwise and with stirring to 0.1 mol of thiophosphoryl chloride and the reaction mixture allowed to stand for 16 hours. At the end of this time the mixture was filtered to separate pyridine hydrochloride, and the filtrate reacted with 28 grams of normaldodecylamine at room temperature and allowed to stand for 16 hours. The crude reaction mixture was again filtered to separate dodecylamine hydrochloride and the filtrate reacted with a large molecular excess of liquid ammonia. The crude product was filtered, and the filtrate successively washed with dilute aqueous sodium hydroxide and water, and dried with calcium chloride. Benzene was removed from the mixture by evaporation to obtain an O-2,4,5-trichlorophenyl N-normaldodecyldiamidothiophosphate product as a light yellow oil having a refractive index $n/D$ of 1.5405 at 35° C., and a density of 1.32 at 24° C.

*Example 21.—O-2,4,5-trichlorophenyl N,N'-dinormalbutyldiamidothiophosphate*

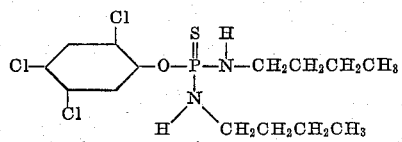

In an exactly comparable operation, 0.1 mol proportions of 2,4,5-trichlorohenol, pyridine and thiophosphoryl chloride were reacted together in the presence of 50 milliliters of benzene. Pyridine hydrochloride was removed by filtration, and the filtrate reacted with 0.4 mol of normalbutylamine and allowed to stand for 64 hours at room temperature. The resulting crude mixture was processed as described in Example 20 to obtain an O-2,4,5-trichlorophenyl N,N'-dinormalbutyldiamidothiophosphate product as a light yellow semi-solid mixture of crystals and viscous oil melting at about 80° C., and having a density of 1.26 at 80° C. and a refractive index $n/D$ of 1.5435 at 35° C.

*Example 22.—O-2,4,5-trichlorophenyl N,N'-dinormalpropyldiamidothiophosphate*

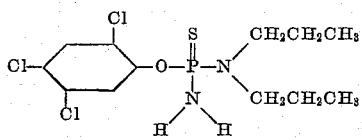

0.1 mol quantities of 2,4,5-trichlorophenol, pyridine and thiophosphoryl chloride were reacted with 0.2 mol of dinormalpropylamine and a large excess of ammonia under the conditions set forth in Example 20. As the principal product from this reaction there was obtained an O-2,4,5-trichlorophenyl N,N'-dinormalpropyldiamidothiophosphate roduct as a viscous yellow oil having a density of 1.53 at 27° C., and a refractive index $n/D$ of 1.5783 at 35° C.

*Example 23.—O-2,4,5-trichlorophenyl N,N'-diisopropyldiamidothiophosphate*

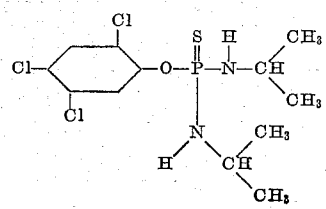

In accordance with the procedure set forth in Example 21, 0.1 mol proportions of pyridine, 2,4,5-trichlorophenol and thiophosphoryl chloride and 50 milliliters of benzene were reacted with 0.4 mol of isopropylamine. An O-2,4,5-trichlorophenyl N,N'-diisopropyldiamidothiophosphate product was obtained from this reaction as a yellow oil having a density of 1.348 at 35° C. and a refractive index $n/D$ of 1.5642 at 35° C.

*Example 24.—O-2,4,5-trichlorophenyl N,N'-dinormaldodecyldiamidothiophosphate*

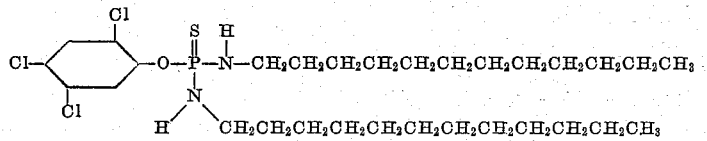

In a similar fashion a preparation was carried out in which 0.4 mol of normaldodecylamine was substituted for the isopropylamine of Example 23. From this reaction there was obtained an O-2,4,5-trichlorophenyl N,N'-dinormaldodecyldiamidothiophosphate product as a yellow viscous oil having a density of 1.4 at 35° C.

*Example 25.—O-2,4,5-trichlorophenyl, N-secondarybutyldiamidothiophosphate*

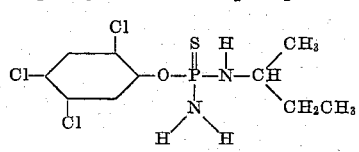

0.1 mol quantities of 2,4,5-trichlorophenol, pyridine and thiophosphoryl chloride were reacted together in the presence of 50 milliliters of benzene as described in Example 20. The resulting intermediate product was filtered, and the filtrate reacted with 0.2 mol of secondary-butylamine. Secondarybutylamine hydrochloride was separated by filtration and the filtrate reacted with a large molecular excess of liquid ammonia. The resulting crude product was processed in the usual manner to obtain an O-2,4,5-trichlorophenyl N - secondarybutyldiamidothiophosphate product as a light yellow semi-solid mixture of crystals and viscous oil. This product melted at 60°–73° C.

*Example 26.—O-2,4,5-trichlorophenyl N-benzyl-N'-ethyldiamidothiophosphate*

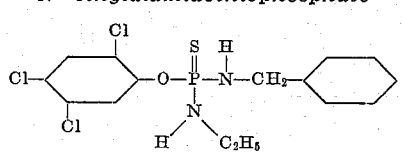

2.3 grams (0.1 mol) of sodium, 19.8 grams (0.1 mol) of 2,4,5-trichlorophenol, and 17.8 grams (0.1 mol) of N-ethyl dichlorothiophosphate were reacted together substantially as described in Example 17. The addition of the phenolate solution was carried out over a period of 5 minutes and at a temperature of 42°–45° C. The intermediate product so obtained was then reacted with 21.4 grams (0.2 mol) of benzylamine and the crude product thereafter processed as described in Example 17. Upon evaporation of the methylene dichloride, an O-2,4,5-trichlorophenyl N-benzyl-N'-ethyldiamidothiophosphate product was obtained as a yellow oil having a density of 1.24 at 28° C. and a refractive index $n/D$ of 1.5652 at 35° C. Upon standing, this oil solidified to form crystals melting at 74°–77° C.

*Example 27.—O - 2,4,5 - trichlorophenyl N,N'-diethyldiamidothiophosphate*

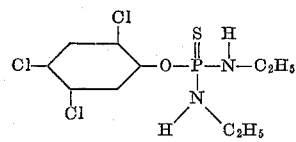

2.3 grams (0.1 mol) of sodium and 19.8 grams (0.1 mol) of 2,4,5-trichlorophenol were mixed together in 100 milliliters of absolute ethyl alcohol. This solution was added portionwise with stirring in 4 minutes and at a temperature of 50°–55° C. to 17.8 grams (0.1 mol) of N-ethyl dichlorothiophosphoramide. This mixture was stirred for 5 minutes at 55°–60° C. and then cooled to room temperature. 10 grams of gaseous ethyl amine was passed into the reaction mixture in 12 minutes at a temperature of 20°–35° C. and the resulting crude product warmed to evaporate off the alcohol. The residue was dispersed in 50 milliliters of methylene dichloride and thereafter successively washed with dilute aqueous hydrochloric acid, dilute aqueous sodium hydroxide and water, and dried over anhydrous sodium sulfate. The methylene dichloride was then removed by evaporation to recover an O-2,4,5-trichlorophenyl N,N'-diethyldiamidothiophosphate product as a yellow oil having a density of 1.30 at 23° C. and a refractive index $n/D$ of 1.5256 at 35° C.

*Example 28.—O-2,4,5-trichlorophenyl N-isopropyl-N'-methyldiamidothiophosphate*

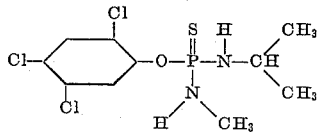

In a similar manner a mixture of 0.1 molar quantities of sodium and 2,4,5-trichlorophenol and 100 milliliters of absolute alcohol was reacted with 19.2 grams (0.1 mol) of N-isopropyl dichlorothiophosphoramide (boiling at 101°–108° C. at 7 mm. pressure). 7 grams of gaseous methylamine was then added to the intermediate reaction mixture at a temperature of 30°–40° C. and the resulting crude product processed as described in Example 27. The residue from evaporation of the methylene dichloride consisted of an O-2,4,5-trichlorophenyl N-isopropyl N'-methyldiamidothiophosphate product as a yellow oil having a density of 1.17 at 23° C. and a refractive index $n/D$ of 1.5049 at 35° C.

*Example 29.—O-2,4,5-trichlorophenyl N-cyclohexyl-N'-methyldiamidothiophosphate*

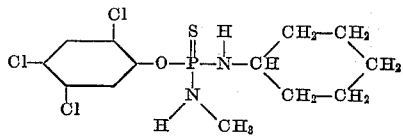

0.05 molar quantities of sodium and 2,4,5-trichlorophenol were mixed together in 75 milliliters of absolute ethyl alcohol and reacted with 11.6 grams (0.5 mol) of N-cyclohexyl dichlorothiophosphoramide (melting at 70° C.) substantially as described in Example 28. In this operation the N-cyclohexyl dichlorothiophosphoramide was first dissolved in 25 milliliters of absolute ethyl alcohol. The intermediate reaction mixture was cooled to room temperature and 7 grams of gaseous methylamine passed into the mixture over a period of 7 minutes at 25°–35° C. The resulting crude material was processed as described in Example 27 to obtain an O-2,4,5-trichlorophenyl N-cyclohexyl - N' - methyldiamidothiophosphate product as a viscous orange oil having a density of 1.11 at 23° C. and a refractive index $n/D$ of 1.5193 at 35° C.

Other polyhalophenols may be substituted for those shown in the preceding examples to produce diamidothiophosphates of which the following are representative:

O-pentabromophenyl N,N'-diethyldiamidothiophosphate by reacting pentabromophenol with thiophosphoryl chloride in the presence of pyridine, and the resulting intermediate with ethylamine.

O - 2,4,5 - tribromophenyl N - cyclohexyl - N'-ethyldiamidothiophosphate by reacting sodium 2,4,5-tribromophenolate with N-ethyl dichlorothiophosphoramide, and thereafter with cyclohexylamine.

O-2,4-dichloro-6-bromophenyl N,N-diethyldiamidothiophosphate by reacting 2,4-dichloro-6-bromophenol with N,N-diethyl dichlorothiophosphoramide in the presence of pyridine, and thereafter with ammonia.

We claim:

1. An O-polyhalophenyl diamidothiophosphate of the formula:

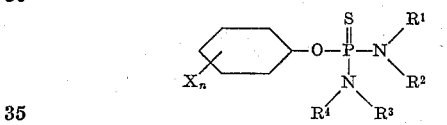

wherein X represents a halogen of the group consisting of chlorine and bromine, $R^1$ represents an alkyl radical, each of $R^2$, $R^3$, and $R^4$ is selected from the group consisting of hydrogen, alkyl, aralkyl and cycloalkyl, and $n$ is an integer from 3 to 5, inclusive.

2. O - pentachlorophenyl N - cyclohexyl - N'-ethyldiamidothiophosphate.

3. O-2,3,4,6 - tetrachlorophenyl N-cyclohexyl-N'-ethyldiamidothiophosphate.

4. O-2,4,6-tribromophenyl N-cyclohexyl - N'-ethyldiamidothiophosphate.

5. O-2,4,6-trichlorophenyl N-cyclohexyl - N'-ethyldiamidothiophosphate.

6. O-2,4,5-trichlorophenyl N-cyclohexyl - N'-ethyldiamidothiophosphate.

LEWIS R. DRAKE.
CLARENCE L. MOYLE.

REFERENCES CITED

The following references are of record in the file of this patent:

UNITED STATES PATENTS

| Number | Name | Date |
|---|---|---|
| 2,146,584 | Lipkin | Feb. 7, 1939 |
| 2,172,241 | Dickey et al. | Sept. 5, 1939 |

FOREIGN PATENTS

| Number | Country | Date |
|---|---|---|
| 500,386 | Great Britain | Feb. 8, 1939 |

OTHER REFERENCES

Autenrieth et al.: "Ber. deutsch. chem. Ges.," vol. 31 (1898), pp. 1094 to 1099.

Ephraim: "Ber. deutsch. chem. Ges.," vol. 44 (1911), pp. 3414–3415.